United States Patent [19]
Kim

[11] Patent Number: 6,057,781
[45] Date of Patent: *May 2, 2000

[54] METHOD FOR URGING TRANSMISSION OF ANSWER MESSAGE IN BILATERAL PAGER

[75] Inventor: Jae-Bin Kim, Yongin, Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,775

[22] Filed: Jun. 30, 1997

[30] Foreign Application Priority Data

Jun. 30, 1996 [KR] Rep. of Korea ............... 96 25961

[51] Int. Cl.[7] .................................................. H04Q 7/00
[52] U.S. Cl. ............................ 340/825.44; 340/311.1; 340/313; 340/825.69; 455/38.1; 455/564
[58] Field of Search ....................... 340/825.44, 311.1, 340/313, 825.69; 455/38.1, 564

[56] References Cited

U.S. PATENT DOCUMENTS

| | | | |
|---|---|---|---|
| 4,940,963 | 7/1990 | Gutman et al. | 340/313 |
| 4,975,694 | 12/1990 | McLaughlin et al. | 340/825.44 |
| 5,332,994 | 7/1994 | Kawashima et al. | 340/825.44 |
| 5,513,241 | 4/1996 | Dimitriadis et al. | 455/564 |
| 5,625,880 | 4/1997 | GOldburg et al. | 455/38.1 |

*Primary Examiner*—Brian Zimmerman
*Assistant Examiner*—Yves Dalencourt
*Attorney, Agent, or Firm*—Dilworth & Barrese

[57] ABSTRACT

A method for urging a transmission of an answer message in a bilateral pager is provided. In an exemplary embodiment, the method includes the step of generating, in an answer transmission mode after receiving a call message, a receipt alarm at given time intervals until the answer message is transmitted or a pre-set time interval has elapsed. An additional receipt alarm is generated when the answer message has not yet been transmitted until a predetermined time has elapsed. A no-answer transmission mode is established after the predetermined time has elapsed without transmission of the answer message.

11 Claims, 3 Drawing Sheets

METHOD FOR URGING TRANSMISSION OF ANSWER MESSAGE IN BILATERAL PAGER

BACKGROUND OF THE INVENTION

1. Field of the Invention

The present invention relates generally to pagers, and more particularly, to a method for urging transmission of an answer message in a bilateral pager when receiving a call message.

2. Description of the Related Art

Generally, a bilateral pager has the capability of receiving a message and transmitting answer data responding to the received message, along with additional data in accordance with a user's selection. A base station exchanger transmits an answer message selected by a user to a call transmitter, forming a communication channel.

FIG. 1 is a block diagram illustrating electronics within a prior art bilateral pager. An RF receiver 11 receives a radio paging signal via an antenna 23, and performs frequency conversion and waveform shaping of the paging signal. The output of RF receiver 11 is thus a radio paging signal converted to digital data, which is then applied to a decoder 12. The decoder 12 sets an operation mode of the radio pager by decoding the digital data. In an idle mode, decoder 12 detects preamble data, and in a batch mode, it detects wordsync data and an established frame data. Also, it decodes the detected frame data to convert the same into original data.

A controller 13 utilizing a microprocessor receives decoded data from decoder 12. Controller 13 controls a call alarm function by processing the received data and generating an alarm control signal. A transmission message and related information is generated by controller 13 by first generating an address designating a particular area of memory. Controller 13 reads data from the relevant area of the memory according to a given output instruction and transfers it to a display 16. An alarm 17 generates an alarm signal such as an audible tone or vibration in response to the alarm control signal transmitted from controller 13. Display 16, typically a liquid crystal display, displays a caller's message, pager state information, and a transmission message and its transmission related information. A first memory 15 (e.g., RAM) stores the transmission message and its transmission related information. A second memory 25 (e.g., PROM) stores address and frame information allocated and peculiar to the pager.

Referring to FIG. 2, a flow chart for processing an answer message responding to a call message in a bilateral pager is shown. Controller 13 transmits an alarm control signal to alarm 17 to generate a "receipt alarm" in step 213 indicating that a page has been received. The receipt alarm is generated when a call message requiring an answer is received by the bilateral pager in step 211. (The caller may select whether or not the page requires an answer). The alarm 17 generates an alarm signal such as an audible tone or vibration selected by a key input. Information related to the call message is stored for a given time in the data base of first memory 15 when the bilateral pager is in an answer transmission mode in step 214. The bilateral pager transmits an answer message to a caller when receiving the call message. The controller 13 operates a timer in step 215.

A reverse paging system (hereinafter referred to as 'RPT') receiving the answer message from a bilateral pager of a receiving party, stores the call message related information for a given time in a database. Accordingly, the RPT transmits the answer message by forming a communication link with the caller when receiving the answer message from the bilateral pager. In the receiving party's bilateral pager and the RPT, the time allocated to store the answer message is restricted due to limited database capacity. After receiving a call, the receiving party selects a proper answer message from multiple answer messages provided previously by means of a key input 10 on the pager (FIG. 1). The selected answer message is transmitted through an RF transmitter 22.

As the timer is operated in step 215, it is determined in step 216 whether or not the above-discussed answer message has been transmitted. If no answer message has been transmitted within a certain time interval, i.e., within a predetermined "mode change time" interval (steps 216–217) the timer is initialized in step 218, and the controller enters a "no-answer transmission mode" is step 219. The RPT erases information related to the caller when no answer message is received within the mode change time. After the mode change time interval, the communication link can not be established even if the answer message is received afterwards. In other words, a bilateral pager user should transmit an answer message within the mode change time. Therefore, a problem with a conventional bidirectional pager is that it is impossible to transmit an answer message to a caller as the RPT erases information related to the caller when no answer message is transmitted within the mode change time.

SUMMARY OF THE INVENTION

It is an object of the present invention to provide a method for urging an answer message transmission so as to answer to a received call message within a mode change time by generating an alarm at pre-determined times.

In an exemplary embodiment of the invention, there is disclosed a method for urging a transmission of an answer message in a bilateral pager. The method includes the step of generating, in an answer transmission mode after receiving a call message, a receipt alarm at given time intervals until the answer message is transmitted or a pre-set time interval has elapsed. An additional receipt alarm is generated when the answer message has not yet been transmitted until a predetermined time has elapsed. A no-answer transmission mode is established after the predetermined time has elapsed without transmission of the answer message.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

As used herein the phrase "mode change time" represents the time interval from, the point of time in which a bidirectional pager receives a call message until the point of time in which the pager can satisfactorily transmit an answer message. It is impossible to transmit the answer message after the mode change time since the RPT erases the caller's information in a database. As used herein, the phrase "answer transmission mode" represents the state of being able to transmit the answer message within the mode change time after receiving the call message. As used herein, the phrase "no-answer transmission mode" represents the state of being unable to transmit the answer message after the mode change time. The answer message is a transmission message confined to the call message.

Figure 1:
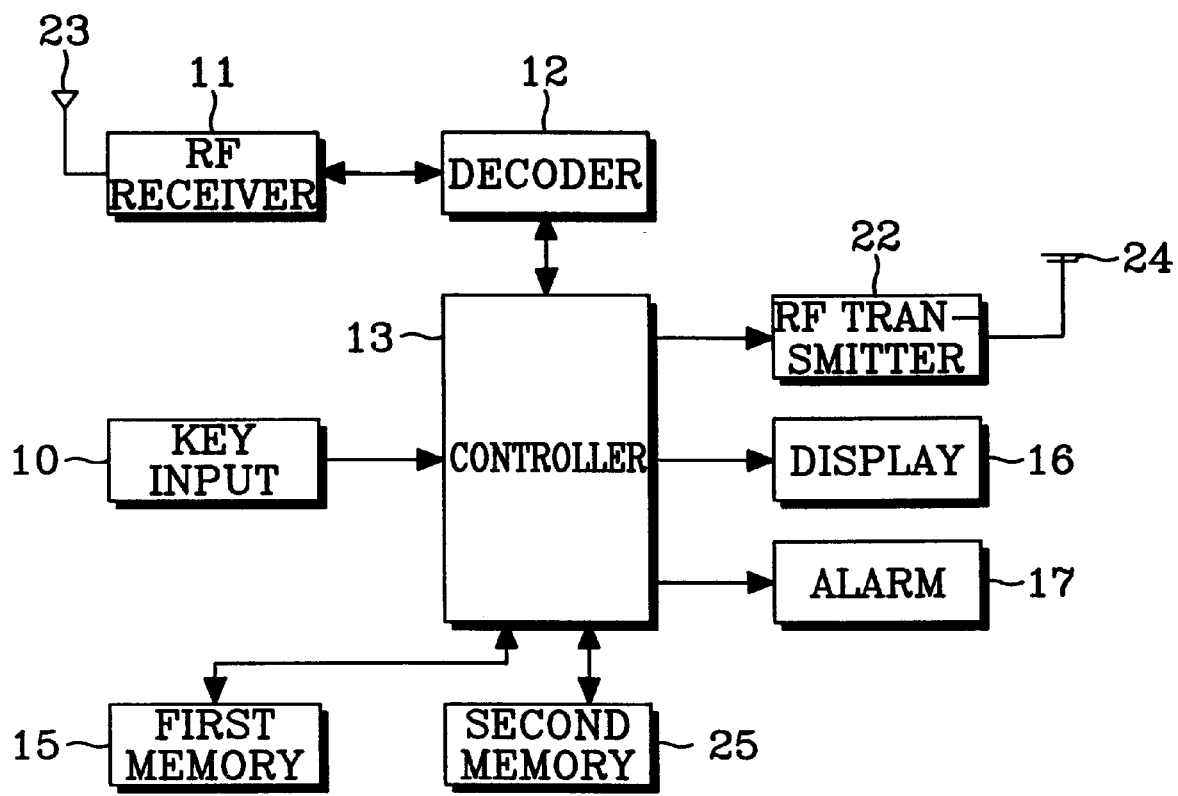
FIG. 1 is a block diagram illustrating a system of a conventional bilateral pager.
Figure 2:
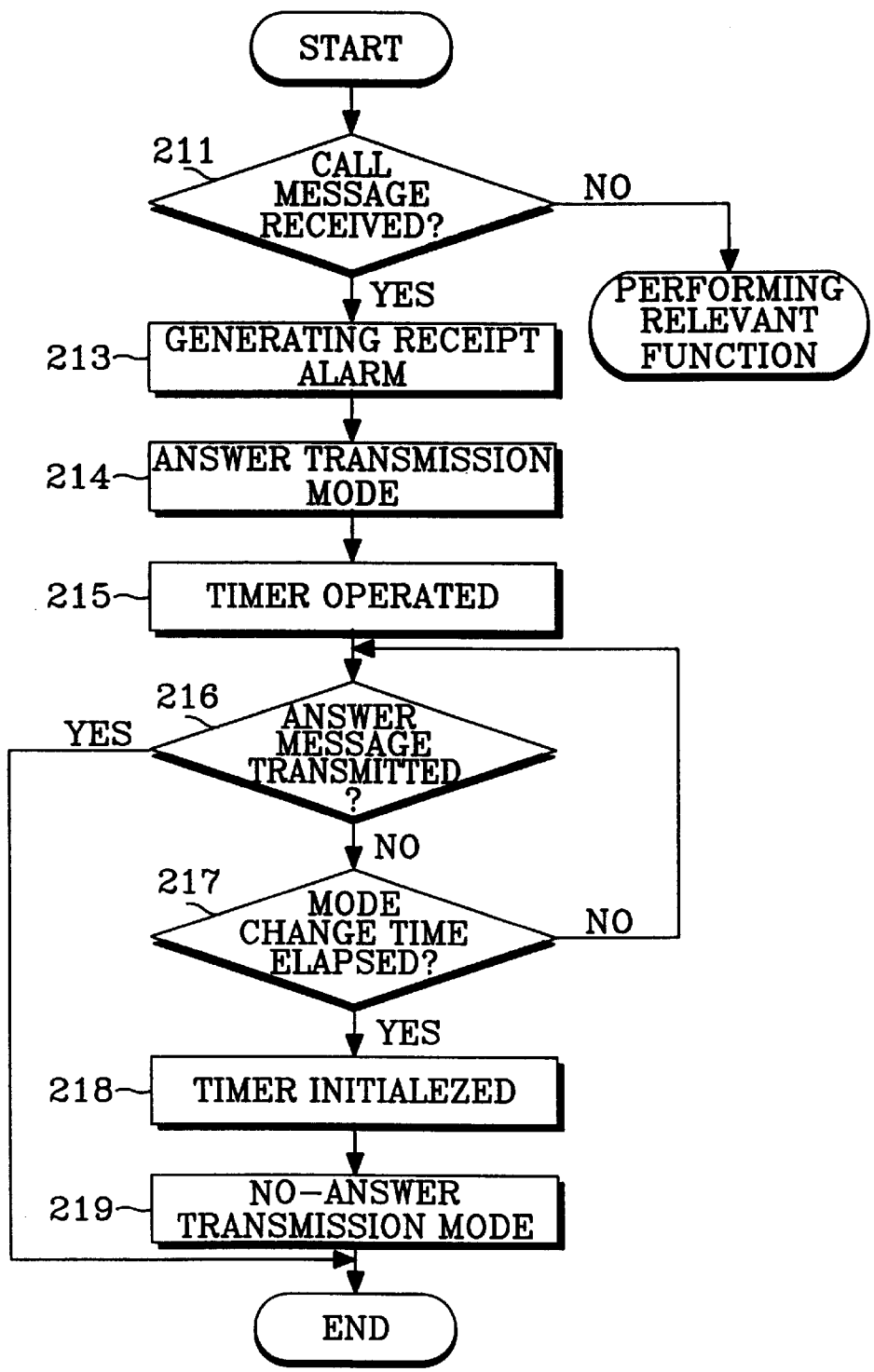
FIG. 2 is a flow chart illustrating processing of an answer message responding to a call message in a conventional bilateral pager.
Figure 3:
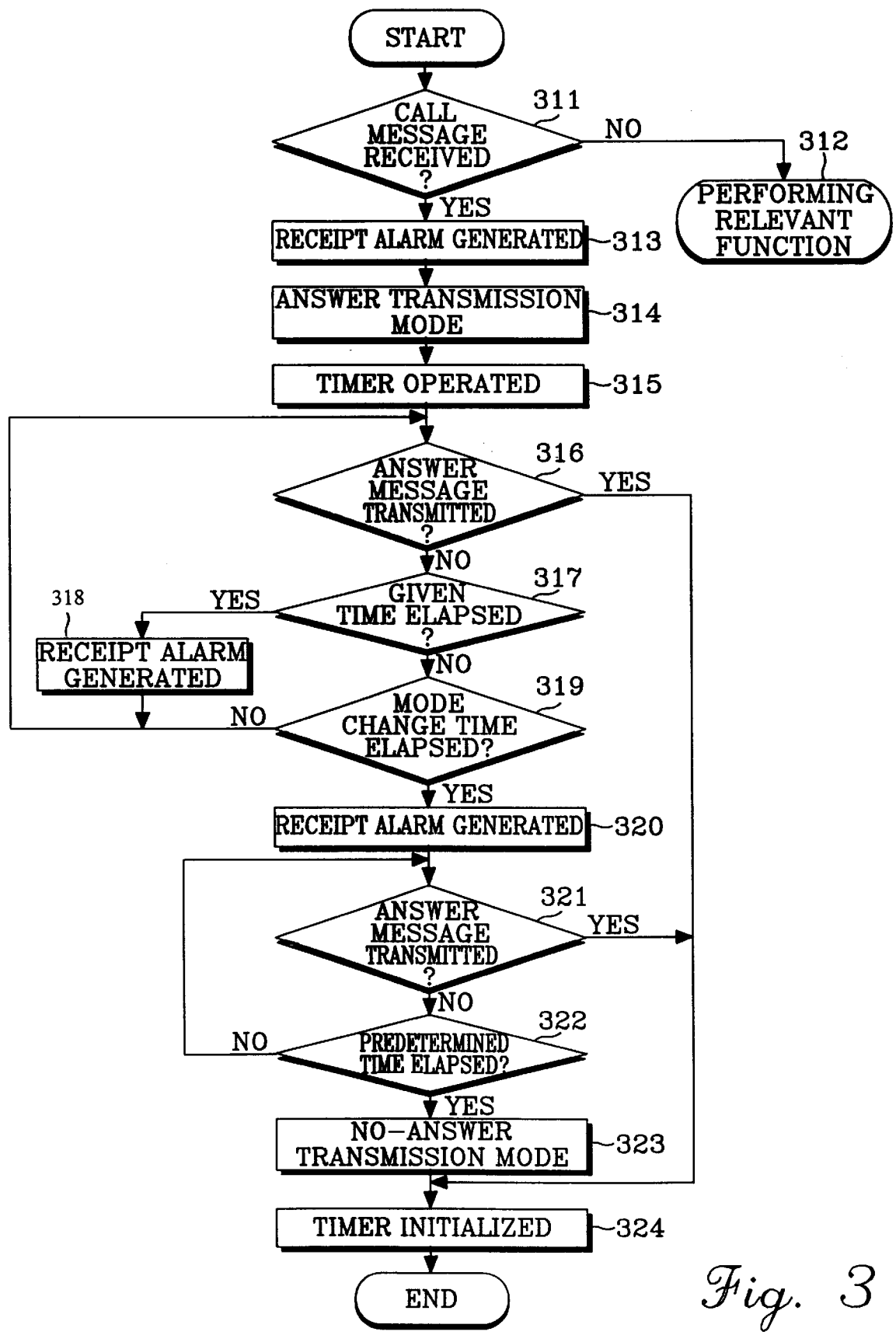
FIG. 3 is a flow chart illustrating processing steps in a bilateral pager according to the present invention, which includes urging an answer message transmission.

Referring to FIG. 3, a flow chart illustrating software flow within a bidirectional pager in accordance with the present invention is shown. The electronic components within a bidirectional pager embodying the present invention may be similar or essentially the same as those described above with respect to the pager of FIG. 1, except modified to implement the software and alarm functions to be described below. In operation, steps 311 to 315 of FIG. 3 are essentially the same as steps 211 to 215 of FIG. 2. Thus, a receipt alarm is generated in step 313 when a call message is received in step 311. The receipt alarm is transmitted as an audible tone signal by a speaker or a vibration signal by a vibrating motor according to a user's selection. Also, the call message is displayed on a display 16 in accordance with the user's selection. The call message is stored in first memory 15. Afterwards controller 13, which is set in the answer transmission mode, drives a timer in step 314. (The timer is within controller 13). The controller 13 determines whether or not the answer message is transmitted in step 316. When a pre-stored answer message is selected by a user, controller 13 transmits the answer message through an RF transmitter 22 to the RPT. The RPT transmits the answer message by forming a communication link with a caller.

After a given time interval "tg" following the receipt of the call message has elapsed, if no answer message has been transmitted in step 316, controller 13 generates a second receipt alarm in step 318. This second receipt alarm urges the user to select an answer message for transmission. The second receipt alarm of step 318 occurs after the given time has elapsed as counted by the above-mentioned timer within controller 13. The given time interval is less than the above-noted mode change time.

Preferably, as indicated by the flow chart, the receipt alarm of step 318 is repeatedly generated every tg seconds while the pager is in the answer transmission mode and there has been no answer message transmission.

If, in step 317, another given time interval tg has not yet elapsed, the flow proceeds to step 319 where the controller determines whether a mode change time has elapsed. If not, the flow proceeds back to step 316. Preferably, the mode change time of step 319 is less than a corresponding mode change time in the reverse paging system (RPT). Thus, if the mode change time of step 319 has elapsed, the flow proceeds to step 320 and there is still a small amount of time remaining in the mode change time of the RPT for the receiving party to transmit an answer message. Thus, in step 320, yet another alarm is generated to again urge the user to transmit an answer message while the mode change time of the RPT has not yet elapsed. As such, the controller 13 lets a user recognize that the received call message will no longer exist as a call message if an answer operation is not made promptly. The controller 13 confirms whether an answer message is transmitted in step 321.

The controller 13 becomes set to a no-answer transmission mode in step 323 when the answer message is not transmitted due to the user failing to select an answer message within a predetermined time interval in step 322. Preferably, the predetermined time interval of step 322 approximately equals the mode change time of the RPT. The timer is then initialized in step 324. On the other hand, the controller 13 performs the answer operation and initializes the timer when a user requests transmission of an answer message selected for responding to a received call message in steps 316 and 321.

As described above, the present invention urges a user to transmit a selected answer message by generating a receipt alarm after a given time interval if the user has not yet initiated an answer operation responding to a received call. This receipt alarm may be repeated periodically. Yet another receipt alarm may be generated as a final warning to the user that the permissible answering interval is about to end. Accordingly, the invention is advantageous in that it increases the probability of a page response and enhances communication efficiency.

It will be understood that the embodiments described herein are merely exemplary and that one skilled in the art can make many variations and modifications to the disclosed embodiments without departing from the spirit and scope of the invention. All such variations and modifications are intended to be included within the scope of the invention as defined by the appended claims.

What is claimed is:

1. A method for urging a transmission of an answer message in a bilateral pager in a reverse paging system having a caller information database, comprising the steps of:

generating, in an answer transmission mode after receiving a call message, a receipt alarm at given time intervals until said answer message is transmitted or a pre-set time interval has elapsed;

generating an additional receipt alarm when said answer message has not yet been transmitted until a predetermined time has elapsed and prior to turning power-off to said bilateral pager, said predetermined time elapsing prior to a mode change time elapsing, wherein the mode change time represents a time interval from a time said call message is received to a time when caller information corresponding to said received call message is erased in the caller information database; and establishing a no-answer transmission mode after said predetermined time has elapsed without transmission of said answer message.

2. A method for urging a transmission of an answer message as defined in claim 1, wherein said receipt alarm is generated as a tone signal or a vibration signal and afterwards said call message is displayed on a display.

3. A method for urging a transmission of an answer message in a bilateral pager in a reverse paging system having a caller information database, comprising the steps of:

generating a receipt alarm, setting the pager to an answer transmission mode and driving a timer when receiving a call message;

generating another receipt alarm at given intervals by an operation of said timer if no answer message has been transmitted responsive to said call message and prior to turning power off to said bilateral pager;

generating an additional receipt alarm when said answer message is not transmitted until reaching the starting point of a predetermined mode change time and prior to turning power off to said bilateral pager, wherein the mode change time represents a time interval from a time said call message is received to a time when caller information corresponding to said received call message is erased in the caller information database; and establishing a no-answer transmission mode with initialization of said timer after said predetermined time without transmission of said answer message.

4. A method for use in a bilateral pager in a reverse paging system having a caller information database, comprising the steps of:

receiving an incoming page;

generating, responsive to said incoming page, a first receipt alarm;

generating a second receipt alarm at predetermined time intervals following receipt of said page, to alert a user to respond to the incoming page prior to the expiration of a pre-established time interval and prior to turning power off to said bilateral pager; and generating an additional alarm following expiration of said pre-established answering interval to alert a user to respond to the page prior to expiration of a mode change time interval of the reverse paging system, wherein the mode change time represents a time interval from a time said call message is received to a time when caller information corresponding to said received incoming page is erased in the caller information database.

5. The method of claim 4 wherein said second receipt alarm is generated at the predetermined time intervals following receipt of said page until the page is responded to or said pre-established time interval has elapsed.

6. The method of claim 4, further comprising retrieving a selected message stored in a memory of the pager responsive to user key depression to transmit an answer message responsive to the incoming page.

7. The method of claim 4, wherein said second receipt alarm is generated responsive to a timer counting for said predetermined time intervals.

8. The method of claim 7, further comprising resetting said timer following expiration of said pre-established time interval.

9. The method of claim 4 wherein said pre-established interval is less than the mode change time of the reverse paging system.

10. The method of claim 9 wherein said second receipt alarm is generated at the predetermined time intervals following receipt of said page until the page is responded to or said pre-established time interval has elapsed.

11. The method of claim 1 wherein said pre-set time interval corresponds to a mode change time interval of the bilateral pager.

* * * * *